(12) United States Patent
Jeon

(10) Patent No.: US 8,453,292 B2
(45) Date of Patent: Jun. 4, 2013

(54) CONNECTING DEVICE FOR CONNECTING WIPER BLADE TO WIPER ARM

(75) Inventor: Sung Wook Jeon, chungcheongbuk-do (KR)

(73) Assignee: Bosch Electrical Drives Co., Ltd., Cheongwon-gun chungcheongbuk-do (KR)

(*) Notice: Subject to any disclaimer, the term of this patent is extended or adjusted under 35 U.S.C. 154(b) by 247 days.

(21) Appl. No.: 12/931,799

(22) Filed: Feb. 10, 2011

(65) Prior Publication Data

US 2011/0197386 A1 Aug. 18, 2011

(30) Foreign Application Priority Data

Feb. 18, 2010 (KR) .................. 10-2010-0014410

(51) Int. Cl.
*B60S 1/38* (2006.01)
*B60S 1/40* (2006.01)

(52) U.S. Cl.
USPC ............... 15/250.32; 15/250.351; 15/250.43

(58) Field of Classification Search
USPC ............ 15/250.32, 250.43, 250.44, 250.351, 15/250.352, 250.361
See application file for complete search history.

(56) References Cited

U.S. PATENT DOCUMENTS

| | | | | |
|---|---|---|---|---|
| 3,576,044 A | * | 4/1971 | Besnard | 15/250.32 |
| 6,363,569 B1 | * | 4/2002 | Kotlarski | 15/250.32 |
| 6,634,056 B1 | * | 10/2003 | De Block | 15/250.32 |
| 6,810,555 B2 | * | 11/2004 | Ritt | 15/250.352 |
| 7,690,073 B2 | * | 4/2010 | Marmoy et al. | 15/250.32 |
| 2006/0059647 A1 | * | 3/2006 | Ostrowski | 15/250.32 |

FOREIGN PATENT DOCUMENTS

FR 2838693 * 10/2003
WO WO02/34595 * 5/2002

* cited by examiner

*Primary Examiner* — Gary Graham
(74) *Attorney, Agent, or Firm* — Collard & Roe, P.C.

(57) ABSTRACT

A connecting device for connecting a wiper blade to a wiper arm. The connecting device includes a hinge unit formed at one side of the wiper arm and an adapter provided at an upper end of the wiper blade so that the adapter is coupled to the hinge unit. The hinge unit includes retainers disposed opposite to each other about an opening formed at one side of the wiper arm. A pin is transversely disposed between the retainers. The adapter includes a guide for guiding the pin and a coupling hole connected to the guide so that the pin is hingedly coupled into the coupling hole. Connection between the wiper arm and the wiper blade is achieved by sliding a projecting jaw projecting downward from the coupling hole of the adapter along an inclined plane formed at the pin of the hinge unit and rotating the wiper blade so that one side of the adapter coincides with the inside of the opening.

5 Claims, 4 Drawing Sheets

CONNECTING DEVICE FOR CONNECTING WIPER BLADE TO WIPER ARM

CROSS REFERENCE TO RELATED APPLICATIONS

Applicant claims priority under 35 U.S.C. §119 of Korean Application No. 10-2010-0014410 filed on Feb. 18, 2010, the disclosure of which is incorporated by reference.

BACKGROUND OF THE INVENTION

1. Field of the Invention

The present invention relates to a connecting device for connecting a wiper blade to a wiper arm, and more particularly to a connecting device for connecting a wiper blade to a wiper arm wherein the wiper arm is provided at one side thereof with a hinge unit including retainers having a pin transversely disposed therebetween, the wiper blade is provided at the top of the middle thereof with an adapter for supporting a rubber blade member, by which the structure of the connecting device for connecting the wiper blade to the wiper arm is simplified, the pin is hingedly coupled into a coupling hole of the wiper blade in a state in which a projecting jaw protruding from the upper end of the coupling hole of the wiper blade is engaged with an inclined plane formed at the pin, the angle of the projecting jaw of the coupling hole and the angle of the inclined plane of the pin are adjusted so as to deviate from each other when the wiper blade is rotated so as to be located at the same level as the wiper arm in a state in which the pin and the coupling hole are coupled, thereby preventing the wiper blade from being separated from the wiper arm, and, at the same time, the retainers of the wiper arm are held at opposite sides of the outer circumference of the adapter of the wiper blade, thereby preventing the rotation of the wiper blade after the assembly between the wiper arm and the wiper blade.

2. Description of the Related Art

Generally, a wiper is mounted at a windshield facing forward at the front of a vehicle and a rear window facing backward at the rear of the vehicle to remove rainwater, snow or foreign matter from the windshield and the rear window so that a driver of the vehicle has a secure field of vision.

The wiper generally includes a wiper arm and a wiper blade. The wiper arm has a metal hook, and the wiper blade has a connector for fixing a rubber blade member. The ring of the wiper arm is coupled to the connector of the wiper blade.

Generally, the ring of the wiper arm is caught in a front arc part of the connector of the wiper blade.

Since the ring of the wiper arm is simply caught in the front arc part of the connector of the wiper blade, the ring of the wiper arm is frequently separated forward from the connector during the operation of the wiper, which may lead to the occurrence of a traffic accident.

Also, since the hook, made of a metal material, is exposed outward, the hook is readily corroded. Furthermore, when the vehicle is washed by hand, the hands directly contact a wiper arm connection device, possibly resulting in injury.

SUMMARY OF THE INVENTION

Therefore, the present invention has been made in view of the above problems, and it is a first object of the present invention to provide a connecting device for connecting a wiper blade to a wiper arm wherein the wiper arm is provided with a hinge unit, and the wiper blade is provided with an adapter, thereby improving durability through simplification of the connection structure.

It is a second object of the present invention to provide a connecting device for connecting a wiper blade to a wiper arm wherein the wiper arm is provided at one side thereof with a hinge unit including retainers having a pin transversely disposed therebetween, the wiper blade is provided at the top of the middle thereof with an adapter for supporting a rubber blade member, by which the structure of the connecting device for connecting the wiper blade to the wiper arm is simplified, the pin is hingedly coupled into a coupling hole of the wiper blade in a state in which a projecting jaw protruding from the upper end of the coupling hole of the wiper blade is engaged with an inclined plane formed at the pin, the angle of the projecting jaw of the coupling hole and the angle of the inclined plane of the pin are adjusted so as to deviate from each other when the wiper blade is rotated so as to be located at the same level as the wiper arm in a state in which the pin and the coupling hole are coupled, thereby preventing the wiper blade from being separated from the wiper arm, and, at the same time, the retainers of the wiper arm are held at opposite sides of the outer circumference of the adapter of the wiper blade, thereby preventing the rotation of the wiper blade after the assembly between the wiper arm and the wiper blade.

It is a third object of the present invention to provide a connecting device for connecting a wiper blade to a wiper arm that is capable of restricting the rotating direction of an adapter to only one direction during assembly between the wiper blade and the wiper arm, thereby preventing the back of the adapter from coming into tight contact with the inside of an opening.

In accordance with an aspect of the present invention, the above and other objects can be accomplished by the provision of a connecting device for connecting wiper blade to a wiper arm, the connecting device including a hinge unit formed at one side of the wiper arm, to the other side of which is connected a wiper arm head to which rotational force is transmitted, and an adapter provided at an upper end of the wiper blade so that the adapter is coupled to the hinge unit of the wiper arm, wherein the hinge unit, includes retainers disposed opposite to each other about an opening formed at one side of the wiper arm so that the opening is defined between the retainers, the retainers having a pin transversely disposed therebetween, the adapter comprises a guide for guiding the pin and a coupling hole connected to the guide so that the pin is hingedly coupled into the coupling hole, and connection between the wiper arm and the wiper blade is achieved by sliding a projecting jaw projecting downward from the upper end of the coupling hole of the adapter along an inclined plane formed at the outer circumference of the pin of the hinge unit and rotating the wiper blade so that one side of the adapter coincides with the inside of the opening in a state in which the pin is hingedly coupled in the coupling hole.

The inclined plane of the pin may be provided at opposite ends thereof with first step jaws disposed in tight contact with opposite sides of the projecting jaw to guide the projecting jaw.

The pin may further include stoppers extending from the first step jaws so that the stoppers protrude in a direction in which the inclined plane is cut, and the stoppers may be disposed in tight contact with the upper end of the coupling hole of the adapter to restrict the rotating direction of the adapter to only one direction to prevent the back of the adapter from coming into tight contact with the inside of the opening.

The stoppers and the first step jaws may be provided at the bottoms thereof with sink mark preventing spaces for preventing sink marks from being formed at outer circumferences of the retainers.

Each of the retainers may further include a locking protrusion configured to be held at the outer circumference of the adapter, and the locking protrusion has first and second tapered planes tapered upward and downward from the middle thereof.

The adapter may be provided at opposite sides thereof with a guide groove corresponding to a rotational range within which the locking protrusions can be rotated about the pin, and the guide groove may be provided with second step jaws, along which the locking protrusions are inserted into or removed from the guide groove to hold or release ends of the retainers.

Each of the second step jaws may have a third tapered plane, along which a corresponding one of the locking protrusions is smoothly inserted into the guide groove.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a connecting device for connecting a wiper blade to a wiper arm according to the present invention will be described in detail with reference to the accompanying drawings.

Figure 1:
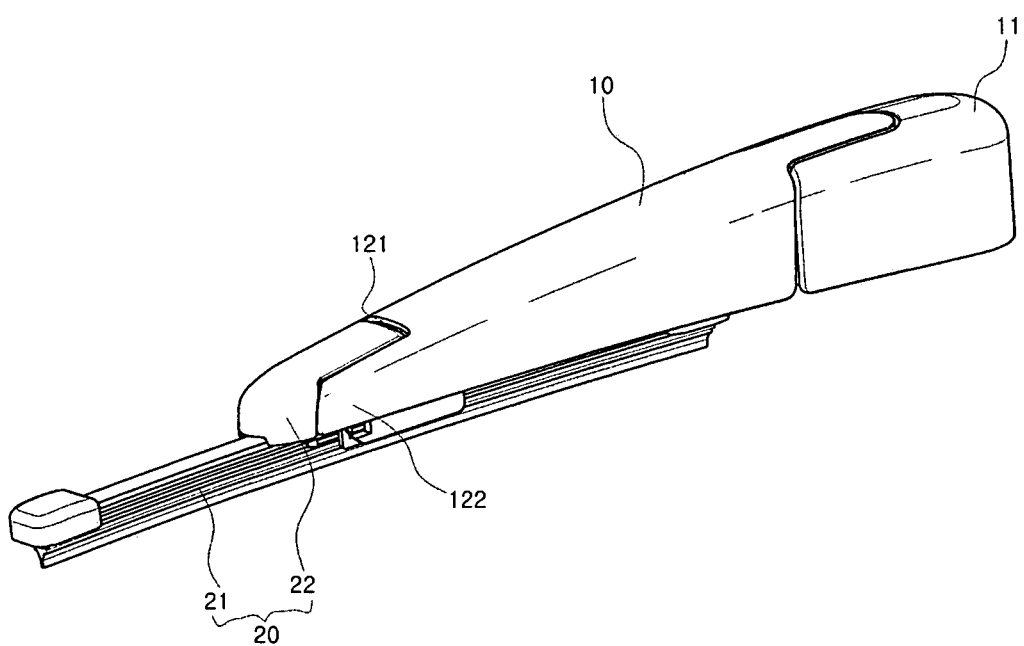
FIG. 1 is a perspective view illustrating coupling between a wiper blade and a wiper arm performed by a connecting device for connecting a wiper blade to a wiper arm according to the present invention.
Figure 2:
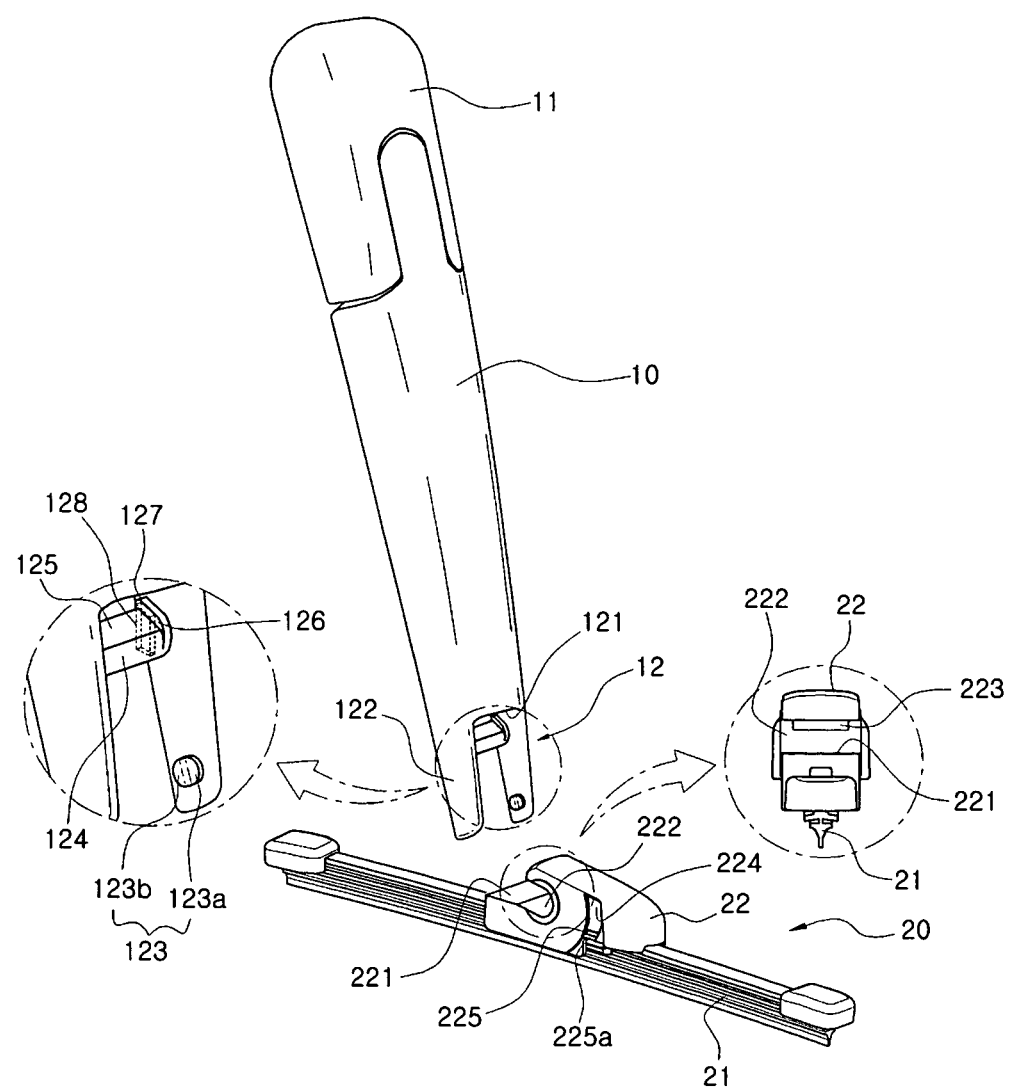
FIG. 2 is an exploded perspective view of FIG. 1.

FIG. 1 is a perspective view illustrating coupling between a wiper blade and a wiper arm performed by a connecting device for connecting a wiper blade to a wiper arm according to the present invention, and FIG. 2 is an exploded perspective view of FIG. 1.

As shown in FIGS. 1 and 2, the present invention provides a connecting device for connecting a wiper blade to a wiper arm wherein a wiper arm 10 is provided at one side thereof with a hinge unit 12 including retainers 122 having a pin 124 transversely disposed therebetween, a wiper blade 20 is provided at the top of the middle thereof with an adapter 22 for supporting a rubber blade member 21, by which the structure of the connecting device for connecting the wiper blade to the wiper arm is simplified, the pin 124 is hingedly coupled into coupling hole 222 of the wiper blade 20 in a state in which a projecting jaw 223 protruding from the upper end of the coupling hole 222 of the wiper blade 20 is engaged with an inclined plane 125 formed at the pin 124, the angle of the projecting jaw 223 of the coupling hole 222 and the angle of the inclined plane 125 of the pin 124 are adjusted so as to deviate from each other when the wiper blade 20 is rotated so as to be located at the same level as the wiper arm 10 in a state in which the pin 124 and the coupling hole 222 are coupled, thereby preventing the wiper blade 20 from being separated from the wiper arm 10, and, at the same time, the retainers 122 of the wiper arm 10 are held at opposite sides of the outer circumference of the adapter 22 of the wiper blade 20, thereby preventing the rotation of the wiper blade 20 after the assembly between the wiper arm 10 and the wiper blade 20.

The connecting device for connecting the wiper blade to the wiper arm includes two units, i.e. the hinge unit disposed at one side of the wiper arm 10, the hinge unit 12 including the retainers 122 having the pin 124 transversely disposed therebetween, and the adapter 22 provided at the top of the middle of the wiper blade 20 to support the rubber blade member 21.

The hinge unit 12 is formed at one side of the wiper arm 10, to the other side of which is connected a wiper arm head 11 to which rotational force is transmitted.

The hinge unit 12 includes an opening 121 formed at one side of the wiper arm 10 and the retainers 122 disposed opposite to each other about the opening, 121 defined between the retainers 122, the retainers 122 having the pin 124 transversely disposed therebetween.

The pin 124 is provided at the outer circumference thereof with the inclined plane 125, which is formed by cutting, so that the wiper blade 20 can be coupled to the wiper arm 10 only in one direction. The pin 124 is formed in a "D" shape in section.

Each of the retainers 122 has a locking protrusion 123 configured to be held at the outer circumference of the adapter 22.

In addition, the adapter 22 includes a guide 221 for guiding the pin 124 and the coupling hole 222 connected to the guide 221 so that the pin 124 guided by the guide 221 is hingedly coupled into the coupling hole 222.

The coupling hole 222 is open in the direction in which the guide 221 is formed so that pin 124 is hingedly coupled into the coupling hole 222. That is, the coupling hole 222 is connected to the guide 221.

Also, as shown in an enlarged left side view illustrating the wiper blade when viewed from the left side of FIG. 2, the projecting jaw 223 projects downward from the upper end of the coupling hole 222 of the adapter 22 so that the projecting jaw 223 corresponds in shape to the inclined plane 125 of the pin 124 and thus can be slid along the inclined plane 125 of the pin 124.

Consequently, the connection between the wiper arm 10 and the wiper blade 20 is carried out as follows. The pin 124 is inserted along the guide 221, the cut angle of the inclined plane 125 formed at the pin 124 and the angle of the projecting jaw 223 projecting from the coupling hole 222 are aligned with each other, the projecting jaw 223 is slid along the inclined plane 125 of the pin 124 to hingedly couple the pin 124 into the coupling hole 222, and the wiper blade 20 is rotated so that one side of the adapter 22 coincides with the inside of the opening 121.

The projecting jaw 223 is configured so as to be slid in a state in which the projecting jaw 223 is engaged with the inclined plane 125 of the pin 124. That is, the direction in which the wiper blade 20 is inserted into the wiper arm 10 is decided by the angle of the inclined plane 125 of the pin 124.

The inclined plane 125 of the pin 124 is provided at opposite ends thereof with first step jaws 126 disposed in tight contact with opposite sides of the projecting jaw 223 for guiding the projecting jaw 223 so that the wiper blade 20 can be slid without shaking of the wiper blade 20 during the assembly of the wiper blade 20.

Also, the pin 124 further includes stoppers 127 extending from the first step jaws 126 so that the stoppers 127 protrude in the direction in which the inclined plane 125 is cut.

The stoppers 127 are disposed in tight contact with the upper end of the coupling hole 222 of the adapter 22 for restricting the rotating direction of the adapter 22 to only one direction to prevent the back of the adapter from coming into tight contact with the inside of the opening 121, thereby preventing damage to the adapter 22.

Meanwhile, the adapter 22 is provided at the outer circumference thereof with a guide groove 224 corresponding to a rotational range within which the locking protrusions 123 are rotated about the pin 124.

The guide groove 224 is provided with second step jaws 225, along which the locking protrusions 123 are inserted into or removed from the guide groove 224 to hold or release ends of the retainers 122.

In addition, each of the locking protrusions 123 formed at the insides of the respective retainers 122 has first and second tapered planes 123a and 123b tapered upward and downward from the middle thereof so that the locking protrusions 123 are inserted into or removed from the guide groove 224 along the second step jaws 225.

Also, each of the second step jaws 225 has a third tapered plane 225a corresponding to the first tapered plane 123a of each of the locking protrusions 123.

Consequently, when the wiper blade 20 is rotated so that one side of the adapter 22 corresponds to the inside of the opening 121 of the hinge unit 12, the first tapered planes 123a of the locking protrusions 123 come into contact with the third tapered planes 225a of the second step jaws 225, and therefore, the retainers 122 are inserted into the guide groove 224 while the retainers 122 are curved outward.

As a result, the retainers 122 of the wiper arm 10 are held at the opposite sides of the outer circumference of the adapter 22 of the wiper blade 20, and therefore, the wiper blade is prevented from being rotated after assembly between the wiper arm 10 and the wiper blade 20.

When the wiper blade 20 is to be separated from the wiper arm 10, on the other hand, the second tapered planes 123b of the locking protrusions 123 are separated from the respective second step jaws 225, thereby releasing the retainers 122.

In addition, the stoppers 127 and the first step jaws 126 of the pin 124 are provided at the bottoms thereof with sink mark preventing spaces 128 for preventing sink marks from being formed at the outer circumferences of the retainers 122.

Temperature at the point where the pin 124 is formed is very high. The sink mark preventing spaces 128 are provided to prevent sink marks from being formed at the outer circumferences of the retainers 122 due to shrinkage thereof.

Hereinafter, the operation of the connecting device for connecting the wiper blade to the wiper arm according to the present invention will be described in detail with reference to the accompanying drawings.

Figure 3:
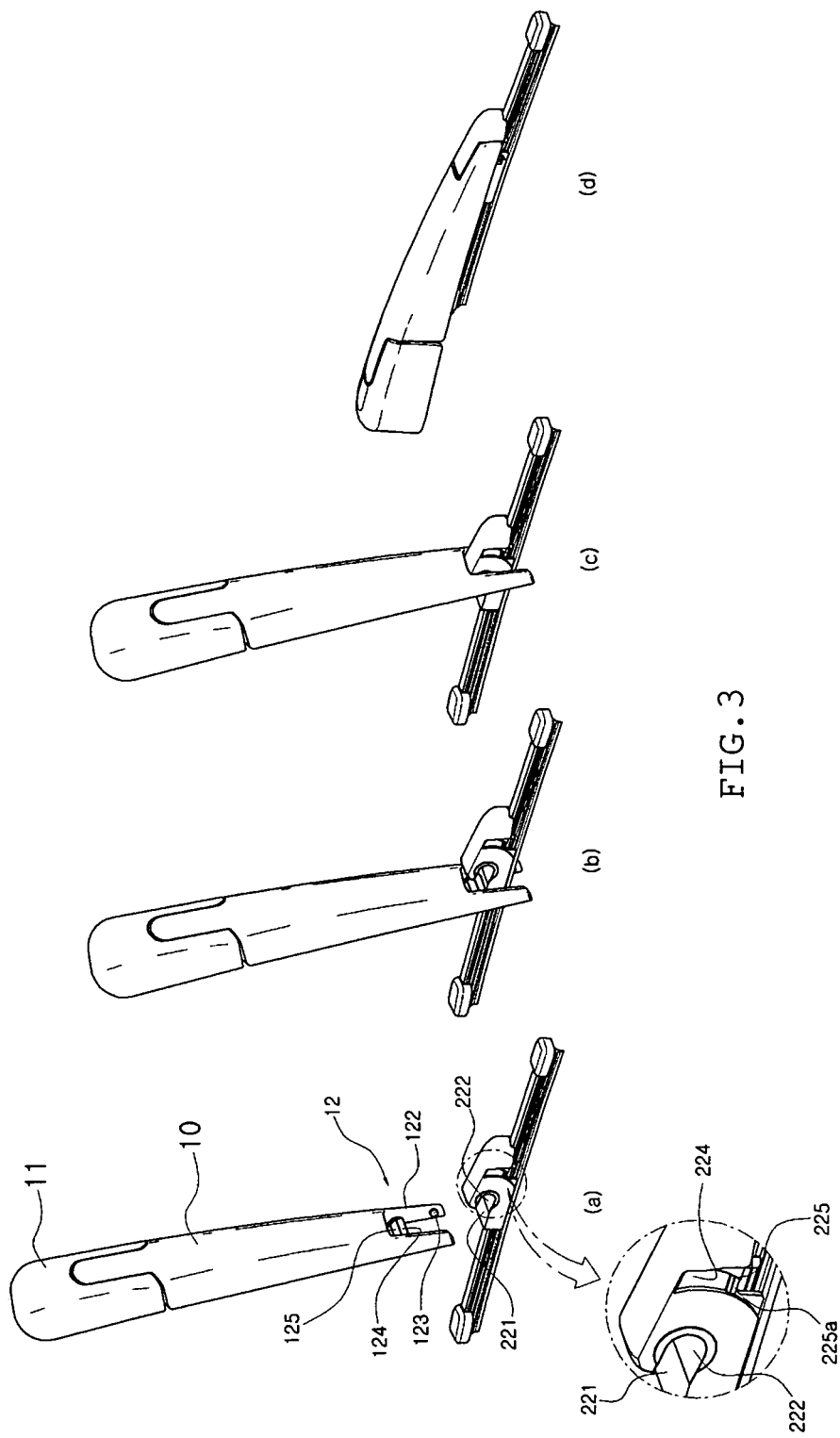
FIGS. 3 and 4 are assembly views of the connecting device for connecting the wiper blade to the wiper arm according to the present invention.
Figure 4:
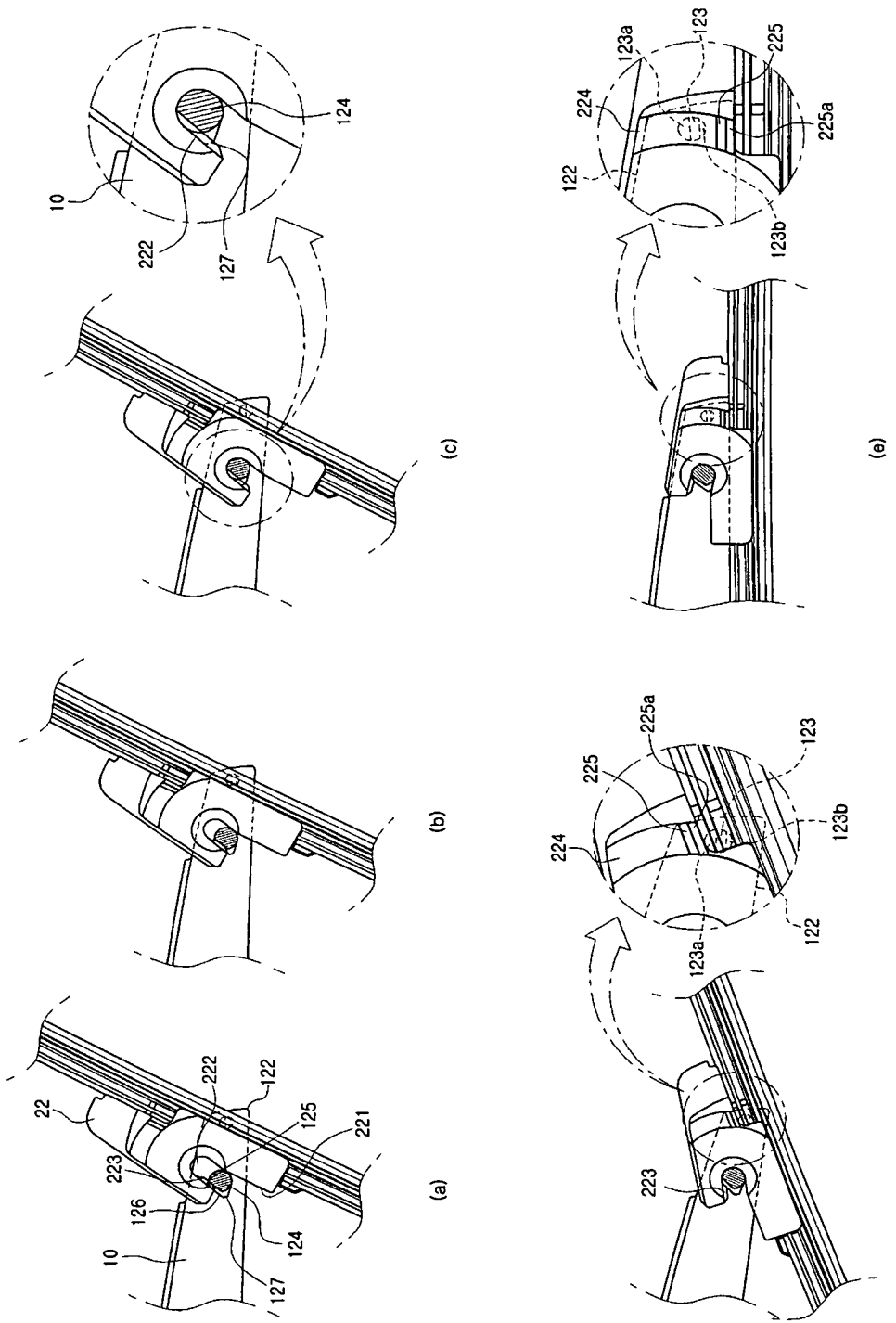

FIGS. 3 and 4 are assembly views of the connecting device for connecting the wiper blade to the wiper arm according to the present invention.

Referring first to FIG. 3, the assembly and disassembly between the wiper arm 10 and the wiper blade 20 through the connecting device for connecting the wiper blade to the wiper arm are carried out through four steps.

Although the wiper arm 10 is drawn as being rotated on the basis of the wiper blade 20 in FIG. 3, unlike FIG. 4, a description will be given hereinafter on the assumption that the wiper blade 20 is rotated on the basis of the wiper arm 10.

First, the wiper blade 20 is assembled to the wiper arm through four steps.

Step (A): The cut angle of the inclined plane 125 formed at the pin 124 of the wiper arm 10 is adjusted so as to coincide with the approach angle of the projection jaw 223 projecting from the coupling, hole 222 of the adapter 22.

Step (B): The pin 124 is inserted along the guide 221 of the adapter 22.

Step (C): The pin 124 is hingedly coupled into the coupling hole 222.

Step (D): The wiper blade 20 is rotated so as to be arranged at the same level as the wiper arm 10 in a state in which the pin 124 and the coupling hole 222 are coupled, thereby achieving the assembly between the wiper arm 10 and the wiper blade 20.

The wiper blade 20 is separated from the wiper arm in the reverse order, i.e. in the order of Step (D), Step (C), Step (B) and Step (A).

The detailed sequence of the assembly between the wiper arm 10 and the wiper blade 20 will be described with reference to FIG. 4.

Steps (a) and (b): The wiper blade 20 intersects the wiper arm 10 so that the adapter 22 is located above the opening 121 of the hinge unit 12 of the wiper arm 10.

Subsequently, the cut angle of the inclined plane 125 formed at the pin 124 of the wiper arm 10 is adjusted so as to coincide with the approach angle of the projection jaw 223 projecting from the coupling hole 222 of the adapter 22, and then the projection jaw 223 is slid along the inclined plane 125 in a state in which the opposite sides of the projection jaw 223 are in tight contact with inner walls of the first step jaws 126.

Step (c): The pin 124 is hingedly coupled into the coupling hole 222. In this state, the stoppers 127 of the pin 124 are disposed in tight contact with the upper end of the coupling hole 222 of the adapter 22 to restrict the rotating direction of the adapter 22 to only one direction to prevent the back of the adapter 22 from coming into tight contact with the inside of the opening 121.

Steps (d) and (e): The wiper blade 20 is rotated so that one side of the adapter 22 coincides with the inside of the opening 121.

At this time, the first tapered planes 123a of the locking protrusions 123 formed at the respective retainers 122 move along the third tapered planes 225a of the second step jaws 225 so that the locking protrusions 123 are inserted into the guide groove 224 to hold the retainers 122. As a result, the adapter 22 is held by the locking protrusions 123 of the respective retainers 122.

When the locking protrusions 123 pass over the second step jaws 225, the retainers 122 are curved outward. When the locking protrusions 123 are inserted into the guide groove 224, the retainers 122 return to original positions thereof. As a result, the locking protrusions are held by the second step jaws 225 as long as force is not applied.

When force is applied to separate the wiper blade 20 from the wiper arm 10, the locking protrusions 123 pass over the second step jaws 225 along the second tapered planes 123b of the locking protrusions 123 with the result that the adapter 22 is released.

In addition, the wiper blade 20 has a gap, defined by the locking protrusions 123 of the retainers 122, corresponding to a section at which the guide groove 224 is formed.

Such a gap functions as a damper to reduce height difference of the wiper blade 20. Consequently, it is possible for the rubber blade member 21 to remain in tight contact with a windshield of a vehicle irrespective of unevenness of the windshield.

As is apparent from the above description, the connecting device for connecting the wiper blade to the wiper arm has the following effects.

The wiper arm is provided with a hinge unit, and the wiper blade is provided with an adapter. Consequently, the present invention has the effect of achieving cost reduction and improving durability based on simplicity of the connection structure.

Also, the wiper arm is provided at one side thereof with a hinge unit including retainers having a pin transversely disposed therebetween, the wiper blade is provided at the top of the middle thereof with an adapter for supporting a rubber blade member, by which the structure of the connecting device for connecting the wiper blade to the wiper arm is simplified, the pin is hingedly coupled into a coupling hole of the wiper blade in a state in which a projecting jaw protruding from the upper end of the coupling hole of the wiper blade is engaged with an inclined plane formed at the pin, the angle of the projecting jaw of the coupling hole and the angle of the inclined plane of the pin are adjusted so as to deviate from each other when the wiper blade is rotated so as to be located at the same level as the wiper arm in a state in which the pin and the coupling hole are coupled, thereby preventing the wiper blade from being separated from the wiper arm, and, at the same time, the retainers of the wiper arm are held at opposite sides of the outer circumference of the adapter of the wiper blade, thereby preventing the rotation of the wiper blade after the assembly between the wiper arm and the wiper blade. Consequently, the present invention has the effect of easily achieving assembly and disassembly between the wiper blade and the wiper arm.

Also, it is possible to restrict the rotating direction of an adapter to only one direction during assembly between the wiper blade and the wiper arm, thereby preventing the back of the adapter from coming into tight contact with the inside of an opening. Consequently, the present invention has the effect preventing damage to the wiper blade.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A connecting device for connecting a wiper blade to a wiper arm, the connecting device comprising:
    a hinge unit formed at one end of the wiper arm, to an other end of which is connected a wiper arm head to which rotational force is transmitted; and
    an adapter provided at an upper end of the wiper blade so that the adapter is coupled to the hinge unit of the wiper arm, wherein
    the hinge unit comprises retainers disposed opposite to each other about an opening formed at one side of the wiper arm so that the opening is defined between the retainers, the retainers having a pin transversely disposed therebetween,
    the adapter comprises a guide for guiding the pin and a coupling hole connected to the guide so that the pin is hingedly coupled into the coupling hole, and
    connection between the wiper arm and the wiper blade is achieved by sliding a projecting jaw projecting downward from an upper end of the coupling hole of the adapter along an inclined plane formed at an outer circumference of the pin of the hinge unit and rotating the wiper blade so that one side of the adapter coincides with an inside of the opening in a state in which the pin is hingedly coupled in the coupling hole,
    wherein the inclined plane of the pin is provided at opposite ends thereof with first step jaws disposed in tight contact with opposite sides of the projecting law to guide the projecting jaw, and
    wherein the pin further comprises stoppers extending from the first step jaws so that the stoppers protrude in a direction in which the inclined plane is cut, and the stoppers are disposed in tight contact with the upper end of the coupling hole of the adapter to restrict a rotating direction of the adapter to only one direction to prevent a back of the adapter from coming into tight contact with the inside of the opening.

2. The connecting device according to claim 1, wherein the stoppers and the first step jaws are provided at bottoms thereof with sink mark preventing spaces for preventing sink marks from being formed at outer circumferences of the retainers.

3. A connecting device for connecting a wiper blade to a wiper arm, the connecting device comprising:
    a hinge unit formed at one end of the wiper arm, to an other end of which is connected a wiper arm head to which rotational force is transmitted; and
    an adapter provided at an upper end of the wiper blade so that the adapter is coupled to the hinge unit of the wiper arm, wherein
    the hinge unit comprises retainers disposed opposite to each other about an opening formed at one side of the wiper arm so that the opening is defined between the retainers, the retainers having a pin transversely disposed therebetween,
    the adapter comprises a guide for guiding the pin and a coupling hole connected to the guide so that the pin is hingedly coupled into the coupling hole, and
    connection between the wiper arm and the wiper blade is achieved by sliding a projecting jaw projecting downward from an upper end of the coupling hole of the adapter along an inclined plane formed at an outer circumference of the pin of the hinge unit and rotating the wiper blade so that one side of the adapter coincides with an inside of the opening in a state in which the pin is hingedly coupled in the coupling hole,
    wherein each of the retainers further includes a locking protrusion configured to be held at an outer circumference of the adapter, and the locking protrusion has first and second tapered planes tapered upward and downward from a middle thereof.

4. The connecting device according to claim 3, wherein the adapter is provided at opposite sides thereof with a guide groove corresponding to a rotational range within which the locking protrusions are rotated about the pin, and
    the guide groove is provided with second step jaws, along which the locking protrusions are inserted into or removed from the guide groove to hold or release ends of the retainers.

5. The connecting device according to claim 4, wherein each of the second step jaws has a third tapered plane, along which a corresponding one of the locking protrusions is smoothly inserted into the guide groove.

* * * * *